Sept. 29, 1953 J. H. ORCHOFF 2,653,367
CLUTCH CLASP CONSTRUCTION
Filed June 19, 1951

INVENTOR.
BY Jacob H. Orchoff
Nathaniel Frucht
ATTORNEY

Patented Sept. 29, 1953

2,653,367

UNITED STATES PATENT OFFICE 2,653,367

CLUTCH CLASP CONSTRUCTION

Jacob H. Orchoff, Providence, R. I.

Application June 19, 1951, Serial No. 232,307

2 Claims. (Cl. 24—216)

The present invention relates to clasp constructions, and has particular reference to clutch devices for releasably gripping a rearwardly projecting stud of an ornament, insignia button, and the like.

The principal object of the invention is to provide an arrangement of parts for obtaining a very strong grip, whereby the shank of the ornament or button cannot inadvertently become loose.

Another object of the invention is to increase the strength of the gripping parts, whereby the effective life of the clutch clasp is greatly increased.

A further object of the invention is to provide a clutch clasp having no projecting sharp edges, whereby fraying of cloth when worn is prevented and ease of operation is facilitated.

An additional object of the invention is to simplify the manufacture of the clutch clasp by forming the clasp of two readily stamped out and assembled members, whereby the cost of manufacture and assembly is reduced.

With the above and other objects and advantageous features in view, the invention consists of a novel arrangement of parts more fully disclosed in the detailed description following, in conjunction with the accompanying drawings, and more specifically defined in the claims appended thereto.

Figure 1:
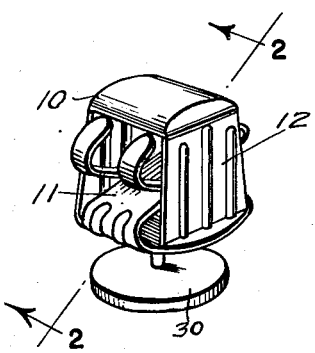
Fig. 1 is a perspective view of the novel clutch clasp, as mounted on a button stud.
Figure 2:
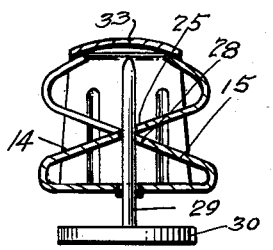
Fig. 2 is a section on the line 2—2 of Fig. 1.
Figure 3:
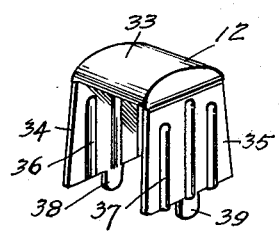
Fig. 3 is a perspective view of the clasp cover.
Figure 4:
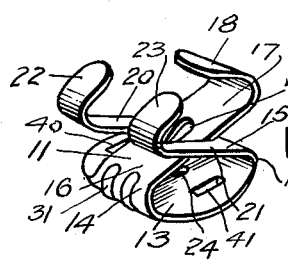
Fig. 4 is a perspective view of the clutch element.

It has been found desirable to provide a stronger and more effective clutch clasp for releasably gripping the stud of an ornament, button, insignia or the like. To this end, I have devised a clutch clasp made of two stamped metal parts, one part being shaped to form a clutch element and the other part being shaped to provide a cover, the parts being ribbed to increase the strength and springiness of cold rolled metal and thus to greatly extend the point of metal fatigue and the effective life of the clasp. I have further devised a construction which has no sharp protruding parts, whereby the operation of the clasp is facilitated and danger of fraying cloth when worn is eliminated.

Referring to the drawings, the novel clutch clasp 10 includes a clutch 11 and a cover 12. The clutch 11 is made in one piece, as hereinafter explained, and has a base plate or disk 13 from which two opposed spring arms 14, 15 extend. The arm 14 has an upwardly bent portion indicated at 16, and an inclined portion 17 which slants upwardly across the disk 13, the upper end 18 being inwardly curved. The arm 15 is bifurcate, with an upwardly bent portion indicated at 19 and two spaced portions 20, 21 which slant upwardly on opposite sides of the arm 14, their upper ends 22, 23 being inwardly curved.

The disk 13 has a central stud receiving aperture 24, and the arm 14 has an opening 25 which is vertically aligned with the aperture 24, its forward edges forming an acute notch 26 and its rear edge 27 being circular. The arm 15 has a central notch 28 which is also vertically aligned with the aperture 24, whereby a pin or stud 29 of a button or the like 30 is received through the aperture 24 and is engaged by the notches 26 and 28. The lower portions of the arms 14, 15 are reinforced at the bent portions 16, 19 by vertical ribs 31, 32.

Figure 5:
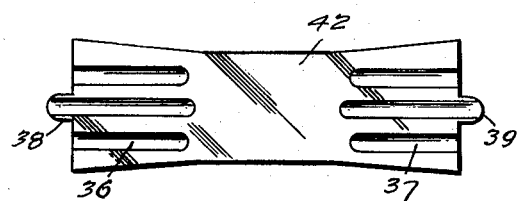
Fig. 5 is a plan view of the cover blank.
Figure 6:
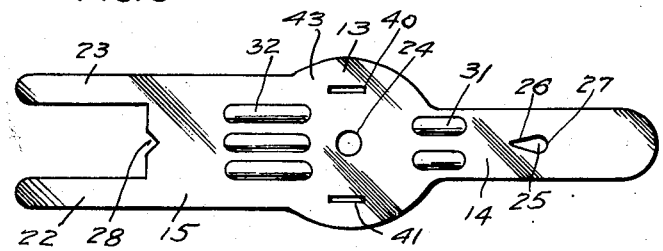
Fig. 6 is a plan view of the clutch element blank.

The cover 12 has a rounded upper portion 33 and two parallel sides 34, 35 which are reinforced by ribs 36, 37. The sides have lower tabs 38, 39, and the disk 13 has diametrically opposed slots 40, 41 into which the tabs 38, 39 seat, whereby the cover is readily seated over the clutch and is locked in place by bending the tabs. The cover is formed from a blank 42, see Fig. 5, and the clutch is formed from a blank 43, see Fig. 6.

When the parts are assembled, the pin or stud 29 readily passes through the disk aperture 24 and through the space between the notches 26 and 28, as the arms 14, 15 shift upwardly to facilitate the stud passage. Any withdrawing movement of the stud, however, is resisted by the notches 26 and 28, as such withdrawing movement pulls the arms 14, 15 downwardly and reduces the distance between the notches. To withdraw the stud, the upper ends 18, 22 and 23 are pressed inwardly, which lifts the arms 14, 15 and increases the distance between the notches 26 and 28, thus releasing the grip of the notch sides on the stud and permitting withdrawal.

Although a specific constructional embodiment of the invention has been disclosed, it is obvious that changes in the size, shape, and arrangement of the parts may be readily made to meet different clutch clasp requirements, without departing from the spirit or the scope of the invention as defined in the appended claims.

I claim:

1. A clutch clasp for sudded buttons, ornaments and the like, comprising a clutch formed from a sheet metal blank and having a flat centrally apertured disk, a resilient arm extending from one side of said disk and bent upwardly and then inclined upwardly across said disk, said arm having an opening with a notch vertically aligned with one side of the disk aperture, and a second resilient arm extending from the other side of the disk and bent upwardly and having two spaced arm portions on opposite sides of the first resilient arm and inclined upwardly across said disk, said second resilient arm having a notch vertically aligned with the other side of the disk aperture, the outer surfaces of the flat disk and the bent upwardly portions of the resilient arms having protruding ribs, said disk having diametrically opposed slots, and a cover extending over the upper edges of the resilient arms and having sides and tabs at the lower ends of the sides, said tabs being locked in said disk slots.

2. A clutch clasp for studded buttons, ornaments and the like, comprising a clutch formed from a sheet metal blank and having a flat centrally apertured disk, a resilient arm extending from one side of said disk and bent upwardly and then inclined upwardly across said disk, said arm having an opening with a notch vertically aligned with one side of the disk aperture, and a second resilient arm extending from the other side of the disk and bent upwardly and having two spaced arm portions on opposite sides of the first resilient arm and inclined upwardly across said disk, said second resilient arm having a notch vertcially aligned with the other side of the disk aperture, the outer surfaces of the flat disk and the bent upwardly portions of the resilient arms having protruding ribs, said disk having diametrically opposed slots, and a cover extending over the upper edges of the resilient arms and having sides and tabs at the lower ends of the sides, said tabs being locked in said disk slots, the upper edges of the resilient arms being inwardly curved.

JACOB H. ORCHOFF.

References Cited in the file of this patent

UNITED STATES PATENTS

| Number | Name | Date |
| --- | --- | --- |
| 2,308,424 | Morehouse | Jan. 12, 1943 |
| 2,367,283 | Judd | Jan. 16, 1945 |
| 2,551,196 | Ballou | May 1, 1951 |